United States Patent [19]
Szabo

[11] Patent Number: 5,748,644
[45] Date of Patent: May 5, 1998

[54] METHOD AND APPARATUS FOR PRODUCING SELF-DIAGNOSTIC INFORMATION FROM A CIRCUIT BOARD

[75] Inventor: Paul Szabo, Beaverton, Oreg.

[73] Assignee: Tektronix, Inc., Wilsonville, Oreg.

[21] Appl. No.: 756,845

[22] Filed: Nov. 26, 1996

[51] Int. Cl.$^6$ ..................................................... G06F 11/00
[52] U.S. Cl. ............................................................. 371/22.5
[58] Field of Search ........................ 371/22.1, 22.5, 371/22.6, 25.1, 27; 395/183.06, 183.42

[56] References Cited

PUBLICATIONS

"Inside The IBM PC & PS/2" Fourth Ed., Peter Norton ©1991 pp. 248–251.
"Norton Utilities User's Guide" ©1993 Symantec Corp. pp. 6–5, 6–6.

*Primary Examiner*—Vincent P. Canney
*Attorney, Agent, or Firm*—William A. Birdwell; Thomas F. Lenihan

[57] ABSTRACT

A method and apparatus for producing self-diagnostic information from a circuit board. A circuit board is provided with an on-board processor, an on-board ROM containing diagnostic test software, a frequency generator adapted to produce an electrical signal having a predetermined frequency when an unacceptable response is determined, wherein the predetermined frequency corresponds substantially to the event within the diagnostic test sequence of a particular test for which an unacceptable response is determined. The signal is presented at an output terminal of the circuit board. The status of the circuit board is determined by measuring the frequency of the signal at the output terminal and comparing that frequency to an index of corresponding defects.

11 Claims, 1 Drawing Sheet

METHOD AND APPARATUS FOR PRODUCING SELF-DIAGNOSTIC INFORMATION FROM A CIRCUIT BOARD

BACKGROUND OF THE INVENTION

This invention relates to self-diagnostic testing of electrical circuit boards and particularly to the production and presentation of self-diagnostic testing information on a circuit board so that the status of the circuit board can be determined using a commonly available electrical signal measuring device, such as a frequency measuring device.

A common type of electrical circuit board ("PCB"), employs an insulating substrate having patterned thereon a plurality of lines or "runs" of a conducting material, the runs forming an electrical signal path between locations on the board at which a lead or pin of an electrical component may be electrically joined, as by soldering. The substrate may be provided in layers, wherein a plurality of layers may include runs. The PCB may complete the manufacturing process in a defective condition, wherein two or more runs are shorted, or one or more runs is open.

The PCB is "loaded" with electrical components in another manufacturing process. The electrical components are typically placed on the PCB so that the pins thereof are positioned on pads which form terminations of the runs and are soldered in place. The loaded PCB ("PCA"), may also exhibit defects resulting from failures of the manufacturing process. Typically, these defects are solder shorts, generally across pins of the electrical components, and lifted pins, wherein a pin fails to make physical contact with its corresponding pad.

Further, the electrical components themselves contribute, typically, a large portion of the defects which result in a PCA that does not function within its the perimeters of its design. Although testing increases manufacturing cost, unless the defect rate is very low, it is generally cost efficient to test a PCA before installing the PCA into an electrical instrument.

Such testing is often done with the use of dedicated off-board test equipment which electrically contacts the PCA, subjects the PCA to various electrical stimuli and measures the electrical responses of the PCA thereto. Typically, the test particulars and sequences are controlled by a computer program ("diagnostic test software"). While testing by this method is relatively comprehensive and is capable of providing relatively detailed failure information ("resolution"), it is also relatively expensive and testing is generally limited to being performed at the location of the test equipment.

Another approach to testing a PCA is to employ an on-board processor to run diagnostic test software resident in on-board ROM ("on-board testing"). This method has the advantage of being portable and relatively inexpensive, generally with a trade-off in comprehensiveness and resolution.

Where a PCA includes a communications port for standard communication, such as an RS-232 interface, on-board testing may employ the port for output to a computer or other peripheral device of digital words that encode information describing the failure or providing direction as to the location of a defect. This method requires a relatively sophisticated and expensive peripheral device that is capable to read and display the data to a user.

Some PCA's, particularly low cost PCA's, will not be provided with a communications port for standard communications with a peripheral device. Moreover, they will often not be provided with a processor which provides for the requisite capability of asynchronous transmission and receiving, such as is normally provided by a UART.

Typically then, lower cost PCA's are provided with a test pin or a binary indicator, such as an LED, for outputting a single bit indication of whether the diagnostic test software has determined a failure or not. In addition to the board space lost to the pin or indicator, the method provides very little resolution.

It is possible, of course, to output serial data bits through the test pin in order to achieve greater resolution. However, again, this generally requires the use of relatively sophisticated or specialized devices for acquiring and reading the data.

Accordingly, there is a need for a novel method and apparatus for producing comprehensive self-diagnostic information from a circuit board and presenting it for analysis in a straight forward manner.

SUMMARY OF THE INVENTION

The method and apparatus for producing self-diagnostic information from a circuit board of the present invention solves the aforementioned problems and meets the aforementioned need by providing a circuit board with self-diagnostic hardware and software which produces at a single output terminal on the circuit board a signal having a frequency representative of the status of the circuit board. The circuit board is provided with an on-board processor and an on-board ROM containing diagnostic test software, the diagnostic test software being adapted to implement a diagnostic test sequence comprising a plurality of tests, each test being adapted to electrically stimulate a portion of the circuit board, measure an electrical response of a portion of the circuit board and characterize the response as either acceptable or unacceptable. A frequency generator is adapted to produce an electrical signal having a predetermined frequency when an unacceptable response is determined, wherein the predetermined frequency corresponds substantially to the event within the diagnostic test sequence of a particular test for which an unacceptable response is determined. The frequency generator is electrically connected to an output test terminal for external connection to a frequency measuring device. Preferably, the frequency generator employs an existing digital clock and an existing ASIC on the circuit board in which has been included a circuit for dividing the digital clock frequency, for producing the plurality of frequencies. Preferably, a table is employed which indexes the predetermined frequencies with corresponding locations on the circuit board which are tested by the test associated therewith.

Therefore, it is a principal object of the present invention to provide a novel method and apparatus for producing self-diagnostic information from a circuit board.

It is another object of the present invention to provide such a method and apparatus that produces and presents the diagnostic information in the form of predetermined frequencies.

It is a further object of the present invention to provide such a method and apparatus that enables the status of a circuit board to be determined by measuring the frequency of a signal produced thereby.

It is still another object of the present invention to provide such a method and apparatus that employs a table which indexes the predetermined frequencies with corresponding locations on the circuit board which are tested by a test associated therewith.

It is yet another object of the present invention to provide such a method and apparatus that employs an existing on-board ASIC to provide the predetermined frequencies.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
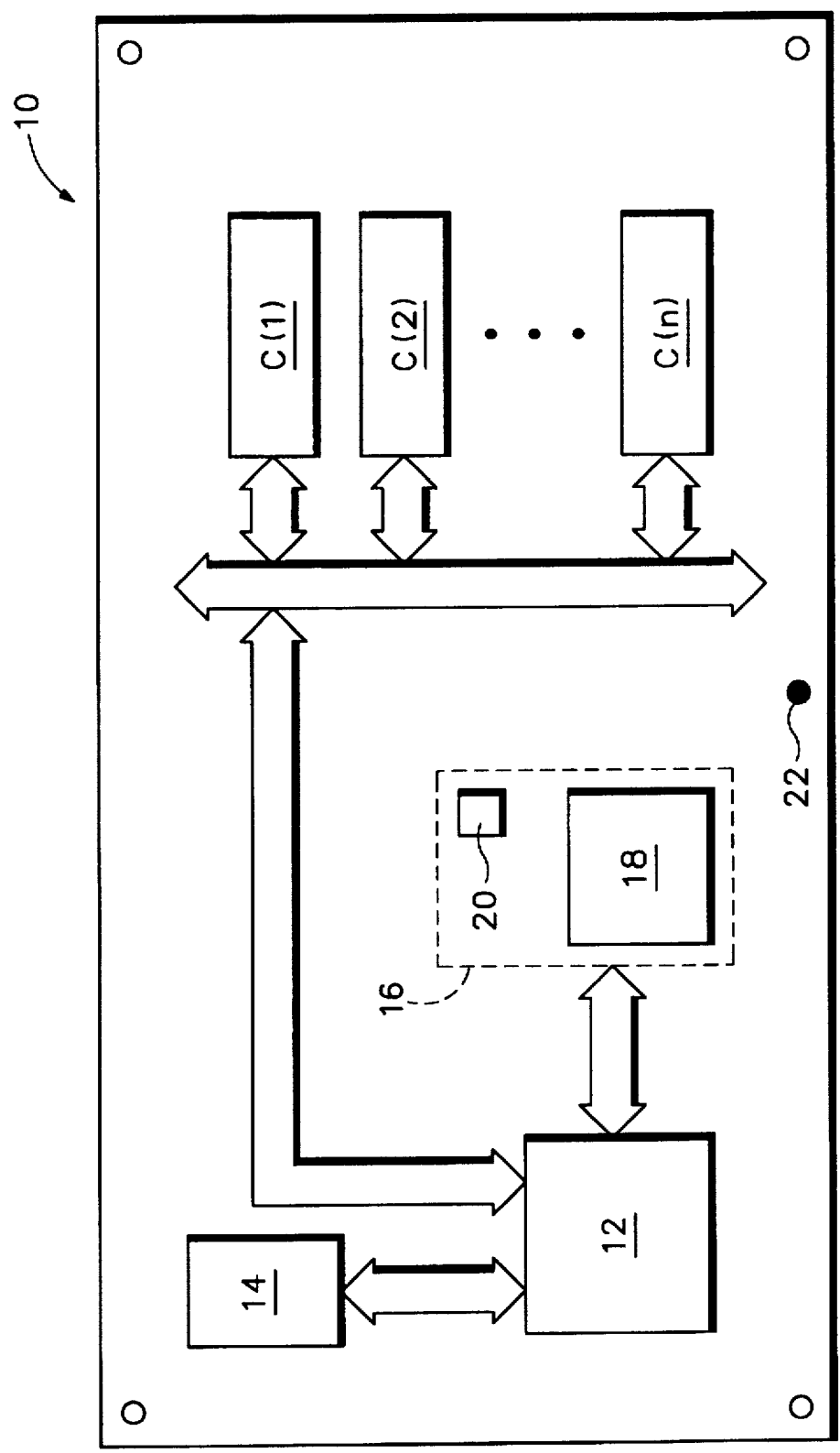
FIG. 1 is a pictorial diagram of a preferred embodiment for an apparatus for producing self-diagnostic information from a circuit board according to the present invention.

Referring to FIG. 1, a preferred embodiment of an apparatus for producing self-diagnostic information from a circuit board according to the present invention employs, in a printed circuit assembly ("PCA") 10, a processor 12, a memory 14 which contains, inter alia, diagnostic test software, and a frequency generator 16. The PCA 10 ordinarily includes other electrical components C(1) ... C(n) which may be integrated circuits, discrete components such as resistors and capacitors, or any other electrical component. After manufacture of the PCA 10, it is often desirable to electrically test the electrical components to verify that there are not (1) solder bridges; (2) solder shorts; (3) shorted runs; (4) open runs; or (5) any other electrical or software malfunction. The processor 12 generally has electrical continuity through runs or electrical components of the PCA 10 with many if not all of the electrical components. Testing of many if not all of the electrical components through use of the processor 12 and the diagnostic test software resident in the memory element 14 is typical of the art.

The diagnostic test software is adapted to implement a diagnostic test sequence comprising a plurality of individual tests, each individual test being adapted to electrically stimulate a portion of the PCA, measure an electrical response of the same portion or a desired other portion of the PCA and characterize the response as either acceptable or unacceptable (a "failure"). The portion of the PCA testing will generally be a location on the PCA which is in electrical continuity with or which resides at a pin or lead of one of the electrical components which it is desired to stimulate or at which it is desired to determine a response.

The frequency generator 16 produces at an output terminal 22 an electrical signal on command of the processor 12, the electrical signal comprising one of a set of substantially discrete predetermined frequencies or tones which correspond to individual tests within the diagnostic test sequence. The output predetermined frequency corresponds to an individual test for which a failure has been determined. Preferably, the diagnostic test software comprises N individual tests and the frequency output element 16 produces an associated N predetermined frequencies. However, the predetermined frequencies may be mapped to the individual tests in other than one-to-one correspondence. Moreover, the predetermined frequencies may be mapped to other features of the diagnostic test software, such as specific lines of code, or may be fewer in number than the number of individual tests without departing from the principles of the invention.

An outstanding feature of the invention is to take advantage of often existing on-board circuitry. For example, lower cost PCA's are often made so by custom integration provided by an Application Specific Integrated Circuit ("ASIC"). Moreover, digital circuit boards invariably include a single frequency generating means ("clock"). The PCA 10 for which the present invention is particularly well suited advantageously includes an ASIC 18 and a clock 20 which provide the mechanism employed by the frequency generator 16. However, the present invention may be carried out with additional components added to the PCA 10 if the PCA for which the invention is employed does not have an ASIC or a clock or other frequency generating means. The modification required to provide a PCA with frequency generating means will be readily apparent to one of ordinary skill in the art.

In the frequency generator 16, the ASIC is coupled to the clock 20 and includes circuitry that divides the clock to provide the plurality of predetermined frequencies. Preferably, there are N divisors for the N individual tests, the divisors providing for conveniently and predeterminedly spaced frequencies (such as substantially evenly spaced frequencies) which facilitate measurement thereof by an external frequency measuring device such as an inexpensive digital multi-meter (DMM) (not shown). However, it will be readily apparent to one of ordinary skill that the frequencies need not be substantially evenly spaced for practice of the invention. The frequency output element 16 is electrically connected to output terminal 22 for external connection to a frequency measuring device. It is an outstanding feature of the present invention that simple and inexpensive hardware, such as the DMM, may be employed to read the output of the element 16.

The frequency output, therefore, identifies an event, such as the conclusion of a particular individual test, in the test sequence at which a failure was determined. From an understanding of the circuit and of the test, a probable cause of a failure determined at a given event in the test sequence may be assigned to the location. Consequently, the frequency output may be employed as a code for the cause of failure and, moreover, of predetermined repair information to be associated therewith. Where the cause of failure is indeterminate or otherwise ambiguously related to a specific frequency, additional or different testing may be employed to provide greater testing resolution. In that event, the information gained by employing the invention may be used to focus a test designer's attention to particular testing areas around which a greater test resolution is appropriate or desired.

In an exemplary embodiment of the invention, the clock frequency is divided to provide predetermined frequencies in blocks of (1) 30 Mhz to 7.5 Mhz; (2) 2.53 Mhz; (3) 1.9 Mhz to 210 kHz; (4) 118 kHz; (5) 105 kHz - 31 kHz; (6) 5 kHz; and (7) 4 kHz to 1 kHz. An exemplary Table "T", comprising sub tables 1 through 8 indexes the predetermined frequencies within these frequency blocks with pins of various electrical components, each frequency representing or coding the event in the diagnostic test sequence at which a failure is determined. Also included in the Table T is a description of the troubleshooting procedure recommended based thereon.

In the above, exemplary, embodiment of the invention, the highest frequencies are assigned to the first individual tests in the diagnostic test sequence, with lower frequencies being assigned to tests farther along in the sequence. However, the frequencies may be assigned in ascending order, in any order, or in no order without departing from the principles of the invention.

TABLE T

1. Initial Power Up Frequencies - 30 Mhz to 7.5 Mhz

| Frequency | Pins/Parts Covered | Description |
|---|---|---|
| None/not measureable | (See Description) | If this happens, the instrument did not power up or frequency is very high. Check CAL-OUT on U201 to verify frequency. Check U200, U201 clock, power and ground pins. |
| 30 Mhz | (See Description) | If this frequency is observed, the instrument could not run any code at all. Check the power and ground pins on U301, and the address pins, data, and chip select pins on U302, U301, and U201. |
| 7.5 Mhz | U301, U201, U302 A0 . . . A23 D0 . . . D7 | Incorrect values are being written to U201. Check the address pins and data pins between the U301 and U201. |

2. PROM checksum test.- 3.8 Mhz

| Frequency | Pins/Parts Covered | Description |
|---|---|---|
| 3.8 Mhz | U302 | Program ROM checksum failed. Check the upper address pins of U302, and then replace U302. Check the checksum on the defective U302. |

3. Walking 0s through field of 1s test on data bus - 2.53 Mhz

| Frequency | Pins/Parts Covered | Description |
|---|---|---|
| 2.53 Mhz | D0 . . . D7 on U201 | Check for floating data bus pins on U201. Address checked is 0x200e00 |

4. Address bus test - 1.9 Mhz to 210 Khz

| Frequency | Pins/Parts Covered | Description |
|---|---|---|
| 1.9 Mhz | U301, U201 A0 . . . A23 | This should never fail . . . |
| 946 Khz | U301, U201 A4 . . . A5 | Pins stuck or floating (address 0x200190) |
| 842 Khz | U301, U201 A4 . . . A5 | Pins stuck or floating (address 0x2001a0) |
| 758 Khz | U301, U201 A0 . . . A23 | This should never fail (address 0x200230) |
| 689 Khz | U301, U201 A8 | Pins stuck or floating (address 0x200280) |
| 631 Khz | U301, U201 A8 | Pins Stuck or floating (address 0x200380) |
| 583 Khz | U301, U201 A9 . . . A10 | Pins Stuck or floating (address 0x200400) |
| 541 Khz | U301, U201 A0 . . . A23 | This should never fail (address 0x2004b0) |
| 505 Khz | U301, U201 A9 . . . A10 | Pins Stuck or floating (address 0x200500) |
| 473 Khz | U301, U201 A9 . . . A10, A4 . . . A5, A7 . . . A8, A11 | Pins Stuck or floating (address 0x200600) |
| 421 Khz | U301, U201 A4 . . . A5 | Pins Stuck or floating (address 0X200610) |
| 90 Khz | U201 - A8 U202 - A0 . . . A7 | Pins stuck or floating on U202, or U201 (address 0x0000f8) |
| 86 Khz | U201 - A9 U202 - A0 . . . A7 | Pins stuck or floating on U202, or U201 (address 0x0001f8) |
| 82 Khz | U201 - A10 U202 - A0 . . . A7 | Pins stuck or floating on U202, or U201 (address 0x0003f8) |
| 79 Khz | U201 - A11 U202 - A0 . . . A7 | Pins stuck or floating on U202, or U201 (address 0x0007f8) |
| 73 Khz | U201 - A12 U202 - A0 . . . A7 | Pins stuck or floating on U202, or U201 (address 0x000ff8) |
| 68 Khz | U201 - A13 U202 - A0 . . . A7 | Pins stuck or floating on U202, or U201 (address 0x001ff8) |
| 63 Khz | U201 - A14 U202 - A0 . . . A7 | Pins stuck or floating on U202, or U201 (address 0x003ff8) |
| 59 Khz | U201 - A15 U202 - A0 . . . A7 | Pins stuck or floating on U202, or U201 (address 0x007ff8) |
| 56 Khz | U201 - A16 U202 - A0 . . . A7 | Pins stuck or floating on U202, or U201 (address 0x00fff8) |
| 53 Khz | U201 - A17 U202 - A0 . . . A7 | Pins stuck or floating on U202, or U201 (address 0x01fff8) |
| 50 Khz | U201 - A18 U202 - A0 . . . A7 | Pins stuck or floating on U202, or U201 (address 0x03fff8) |
| 45 Khz | U201 - A19 U202 - A0 . . . A7 | Pins stuck or floating on U202, or U201 (address 0x07fff8) |
| 41 Khz | U201 - A0 U202 - A0 . . . A7 | Pins stuck or floating on U202, or U201 (address 0x07fffd0) |
| 38 Khz | U201 - A1 U202 - A0 . . . A7 | Pins stuck or floating on U202, or U201 (address 0x07fffd1) |
| 35 Khz | U201 - A2 U202 - A0 . . . A7 | Pins stuck or floating on U202, or U201 (address 0x07fffd3) |
| 33 Khz | U201 - A3 U202 - A0 . . . A7 | Pins stuck or floating on U202, or U201 (address 0x07fffd7) |
| 31 Khz | U201 - A4 U202 - A0 . . . A7 | Pins stuck or floating on U202, or U201 (address 0x07fffdf) |
| 379 Khz | U301, U201 A4 . . . A6 | Pins Stuck or floating (address 0x200620) |
| 344 Khz | U301, U201 A4 . . . A6 | Pins Stuck or floating (address 0x200630) |
| 316 Khz | U301, U201 A4 . . . A6 | Pins Stuck or floating (address 0x200640) |
| 291 Khz | U301, U201 A4 . . . A6 | Pins Stuck or floating (address 0x200650) |
| 270 Khz | U301, U201 A4 . . . A6 | Pins Stuck or floating (address 0x200660) |
| 253 Khz | U301, U201 A4 . . . A6 | Pins Stuck or floating (address 0x200670) |
| 237 Khz | U301, U201 A4 . . . A7 | Pins Stuck or floating (address 0x200680) |
| 223 Khz | U301, U201 A11, A8 | Pins Stuck or floating (address 0x200e00) |
| 210 Khz | U301, U201 A4 . . . A11 | Pins Stuck or floating (address 0x200f00) |

5. DRAM (MA) bus data bus. Walking 0s through field of 1s - 118 Khz

| Frequency | Pins/Parts Covered | Description |
| --- | --- | --- |
| 118 Khz | U202 IO0 ... IO15 WE, OE, RAS UCAS LCAS Pwr Supplies U201 MA0 ... MA8 | Pins stuck or floating on U202, or U201. Address tested is 0x000600. |

6. DRAM and Main Address Bus Test 105 Khz to 31 Khz

| Frequency | Pins/Parts Covered | Description |
| --- | --- | --- |
| 105 Khz | U201 - A5 U202 - A0 ... A7 | Pins stuck or floating on U202, or U201 (address 0x000018) |
| 100 Khz | U201 - A6 U202 - A0 ... A7 | Pins stuck or floating on U202, or U201 (address 0x000038) |
| 95 Khz | U201 - A7 U202 - A0 ... A7 | Pins stuck or floating on U202, or U201 (address 0x000078) |

7. Interrupt Lines or kernel boot-up errors - 5 Khz

| Frequency | Pins/Parts Covered | Description |
| --- | --- | --- |
| 5 Khz | U201 - IPL0, IPL1, IPL2, U301 - IPL0, IPL1, IPL2, AVEC | This indicates that the kernel could not boot, most perhaps because one or more of the interrupt lines has a short, or is open. |

8. Remaining errors - 4 - 1 Khz

| Frequency | Pins/Parts Covered | Description |
| --- | --- | --- |
| 4.0 Khz | Unknown | Instrument hung during hardware driver initialization (Service Layer), NVRAM initialization, or power up diagnostics. |
| 3.7 Khz | U303 all pins try CE, OE, WE first | Indicates NVRAM (flash) failed, and then instrument subsequently hung. |
| 3.3 Khz | U303 all pins try CE, OE, WE first | Indicates NVRAM (flash) failed, and then instrument subsequently booted properly. |
| 3.0 Khz | Acquisition tests failed. See error log. | See Error Log (Section 11.) |
| 2.7 Khz | Personality module bad (or pull-up resistors on main board defective). | Personality module diagnostics failed. This is either the RAM, ROM, or bus. Run extended diagnostics and check the error log to further determine failure. |
| 2.3 Khz | Instrument hung upon screen or state manager initialization | Contact Design Engineering. |
| 1.0 Khz | Instrument powered up okay. | Instrument is okay. |

It is to be recognized that, while a specific method and apparatus for producing self-diagnostic information from a circuit board has been shown as the preferred embodiment of the invention, other configurations and steps could be utilized, in addition to configurations and steps already mentioned, without departing from the principles of the invention. For example, while a printed circuit assembly 10 has been described, the method and apparatus may be employed with any circuit construction, e.g., within an integrated circuit.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

I claim:

1. An electrical circuit for producing diagnostic information, comprising:

a memory adapted to store a sequence of diagnostic tests;

a processor coupled to said memory, said processor executing said sequence of diagnostic tests and recognizing a result of one or more thereof; and a frequency generator coupled to said processor, for generating signals indicative of said result at a plurality of predetermined frequencies, wherein said predetermined frequencies are associated with corresponding events within said sequence of tests, said plurality of predetermined frequencies including a frequency within an audio band of frequencies and a frequency within a band of frequencies greater than said band of audio frequencies; and a terminal coupled to said frequency generator for receiving said signals indicative of said result, and for coupling said signals indicative of said result to external apparatus for frequency measurement and display;

said processor, on recognizing said result in response to a completion of one of said tests, causes said frequency generator to generate a selected one of said signals indicative of said result comprising one of said plurality of predetermined frequencies associated with said events, wherein one of said signals indicative of result indicates a failure of one of said tests, and one of said signals indicative of result indicates a passing of one of said tests.

2. The electrical circuit of claim 1, wherein said predetermined frequencies are mapped substantially one-to-one to said tests.

3. The electrical circuit of claim 1, further comprising electrical circuit elements other than said memory, processor, frequency generator and output terminal, said processor being electrically coupled to at least one of said other circuit elements for applying at least one of said diagnostic tests thereto.

4. A method for producing diagnostic information, comprising the steps of:

executing a sequence of diagnostic tests on an electrical circuit;

recognizing a result of one or more of said tests;

associating a first frequency with a passing result and a second frequency with a failing result, said first and second frequencies being selected from a range of frequencies which range includes audio frequencies and frequencies greater than said audio frequencies;

generating an electrical signal comprising a respective one of said frequencies; and conveying said electrical signal to an external apparatus for frequency measurement and display to indicate said result.

5. The method of claim 4, further comprising indexing said plurality of predetermined frequencies to associated characteristics of said electrical circuit.

6. The method of claim 5, wherein said frequencies are mapped substantially one-to-one to said tests.

7. The method of claim 6, wherein said step of indexing includes associating, with said characteristics, information facilitating repair of said electrical circuit.

8. The method of claim 5, further comprising the steps of providing an electrical circuit board comprising a memory, a processor and a signal generator, storing in said memory said sequence of diagnostic tests, executing said sequence of diagnostic tests and recognizing a failure of one or more of said tests in said processor, and generating said electrical signal in said signal generator.

9. The method of claim 8, further comprising providing said circuit board with a test output terminal and producing said electrical signal at said terminal.

10. The method of claim 9, further comprising measuring the frequency of said electrical signal at said output terminal and comparing said frequency to an index of said plurality of predetermined frequencies to determine associated characteristics of said electrical circuit.

11. The method of claim 10, further comprising providing said circuit board with electrical circuit elements other than said memory, processor, frequency generator and terminal, coupling said processor to said other circuit elements, and applying at least one of said diagnostic tests to at least one of said other circuit elements.

\* \* \* \* \*